(12) United States Patent
Nakamura et al.

(10) Patent No.: US 9,661,159 B2
(45) Date of Patent: *May 23, 2017

(54) INFORMATION PROCESSING DEVICE, AND METHOD AND NON-TRANSITORY COMPUTER-READABLE RECORDING MEDIUM FOR THE SAME

(71) Applicant: BROTHER KOGYO KABUSHIKI KAISHA, Nagoya-shi, Aich-ken (JP)

(72) Inventors: Tomoki Nakamura, Kasugai (JP); Yusaku Takahashi, Kariya (JP); Tomoaki Shibata, Nagoya (JP); Junjiro Yoshida, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,845

(22) Filed: Sep. 29, 2015

(65) Prior Publication Data

US 2016/0094731 A1 Mar. 31, 2016

(30) Foreign Application Priority Data

Sep. 30, 2014 (JP) ................................. 2014-201478

(51) Int. Cl.
*H04N 1/04* (2006.01)
*H04N 1/00* (2006.01)
(Continued)

(52) U.S. Cl.
CPC ..... *H04N 1/00228* (2013.01); *G06F 17/3028* (2013.01); *G06F 17/30091* (2013.01);
(Continued)

(58) Field of Classification Search
CPC ............ H04N 1/00228; H04N 1/2187; H04N 1/00413; H04N 1/00103; H04N 1/00222; H04N 1/00244
(Continued)

(56) References Cited

U.S. PATENT DOCUMENTS

2006/0074849 A1* 4/2006 Lee ................... H04N 1/00236
2010/0046023 A1* 2/2010 Hong ................. H04N 1/00204
358/1.15

FOREIGN PATENT DOCUMENTS

JP 2005-191777 A 7/2005

* cited by examiner

*Primary Examiner* — Houshang Safaipour
(74) *Attorney, Agent, or Firm* — Merchant & Gould P.C.

(57) ABSTRACT

An information processing device may display a first image indicating a storage area. The information processing device may display a second image in response to receiving a first specific operation performed on the first image. The information processing device may receive a second specific operation for selecting the second image. The information processing device may receive first path information in response to receiving the second specific operation The first path information may indicate a location of the storage area. The information processing device may send the first execution instruction to the image processing device, in the case that the second specific operation is received. The information processing device may receive scan data from the image processing device. The information processing device may store a data file of the received scan data in the storage area designated by the first path information.

20 Claims, 7 Drawing Sheets

(51) Int. Cl.
  *H04N 1/21* (2006.01)
  *G06F 17/30* (2006.01)
(52) U.S. Cl.
  CPC ..... *H04N 1/00103* (2013.01); *H04N 1/00222* (2013.01); *H04N 1/00244* (2013.01); *H04N 1/00413* (2013.01); *H04N 1/2187* (2013.01); *H04N 2201/0055* (2013.01); *H04N 2201/0094* (2013.01)
(58) Field of Classification Search
  USPC .............................. 358/1.15, 1.13, 1.9, 403
  See application file for complete search history.

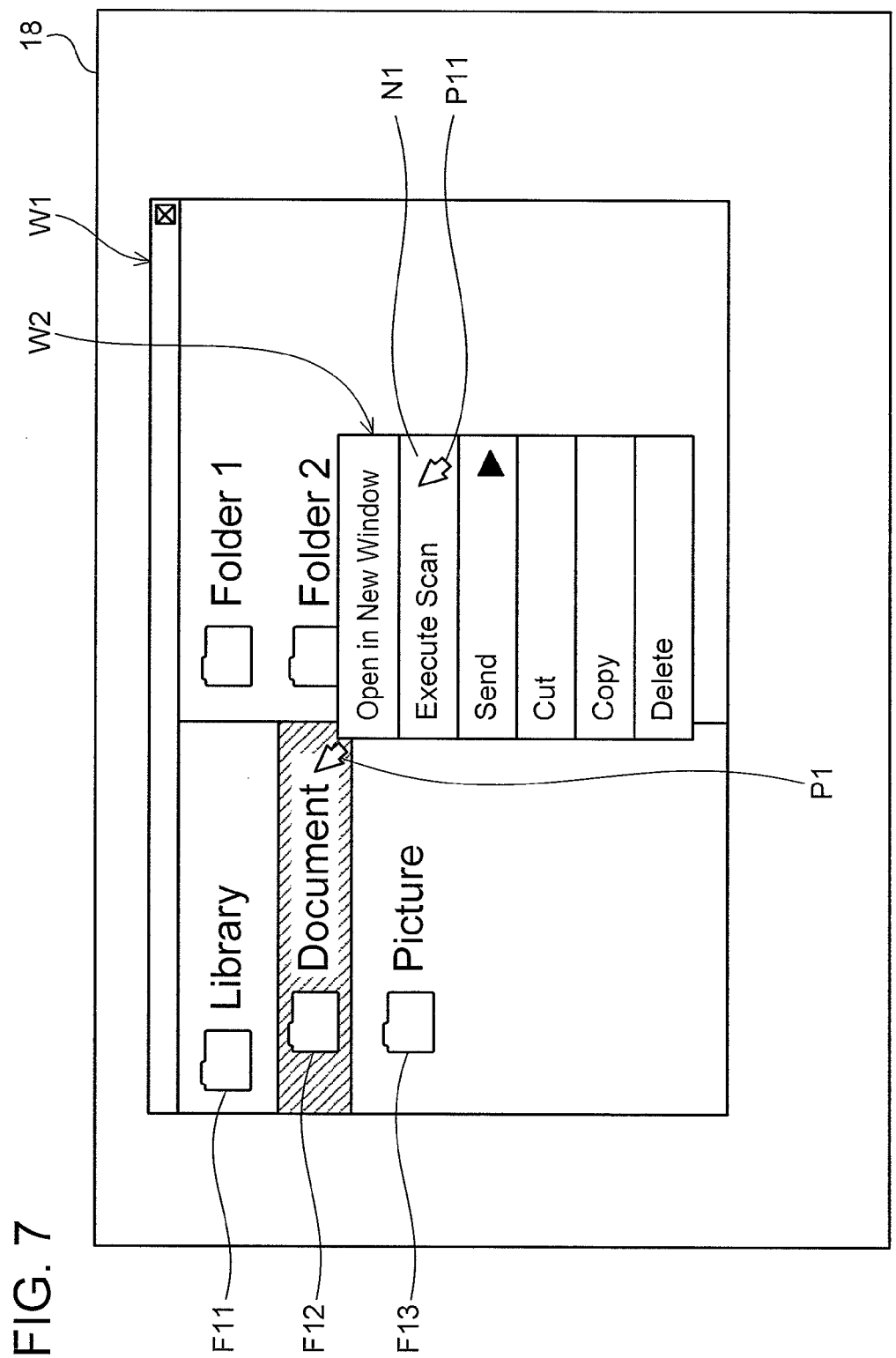

INFORMATION PROCESSING DEVICE, AND METHOD AND NON-TRANSITORY COMPUTER-READABLE RECORDING MEDIUM FOR THE SAME

CROSS-REFERENCE TO RELATED APPLICATIONS

This application claims priority to Japanese Patent Application No. 2014-201478, filed on Sep. 30, 2014, the contents of which are hereby incorporated by reference into the present application.

TECHNICAL FIELD

The technique disclosed in the present specification relates to a program and the like for storing scan data.

DESCRIPTION OF RELATED ART

The following image data receipt method is known. When a user right-clicks on a multifunction peripheral (referred to as MFP) icon being displayed on a display screen of a PC, right-click menus are displayed. When "construct scan data receipt environment" is selected from the right-click menus, the PC creates a transfer destination folder in a hard disk drive. The transfer destination folder is a shared folder that is shared on a network. The PC receives image data generated by an image reading device from the image reading device and stores the image data in the transfer destination folder.

SUMMARY

There is a case in which users want to store the image data generated by the image reading device in a particular folder in the PC. However, when the above mentioned technique is used, it is necessary to move the image data stored in the transfer destination folder to the particular folder. Moreover, even when the above mentioned technique is not used, an operation of designating a particular folder as a storage destination of the image data is required. The present specification provides a technique capable of solving such an inconvenience.

In one aspect of the teachings disclosed herein, a non-transitory computer-readable recording medium storing computer-readable instructions for an information processing device may be provided. The information processing device may comprise: a processor; a display; an input unit configured to receive various operation inputs; a memory provided with a storage area for storing various types of data; and a communication interface configured to connect to a network. The information processing device may be configured to communicate via the communication interface with an image processing device. The image processing device may be configured to perform a scan process of scanning a document and generating scan data. The computer-readable instructions, when executed by the processor, may cause the information processing device to perform displaying a first image indicating the storage area on the display. The computer-readable instructions may cause the information processing device to perform displaying a second image on the display, in response to receiving a first specific operation in the input unit, the first specific operation being performed on the first image. The computer-readable instructions may cause the information processing device to perform receiving a second specific operation in the input unit, the second specific operation being for selecting the second image. The computer-readable instructions may cause the information processing device to perform receiving first path information in response to receiving the second specific operation, the first path information indicating a location of the storage area. The computer-readable instructions may cause the information processing device to perform sending a first execution instruction of the scan process to the image processing device via the communication interface, in the case that the second specific operation is received in the input unit. The computer-readable instructions may cause the information processing device to perform receiving scan data generated by the scan process from the image processing device. The computer-readable instructions may cause the information processing device to perform storing a data file of the received scan data in the storage area designated by the first path information.

BRIEF DESCRIPTION OF DRAWINGS

FIG. 7 is a diagram illustrating an example of a display screen.

EMBODIMENT

<Configuration of Communication System 1>

Figure 1:
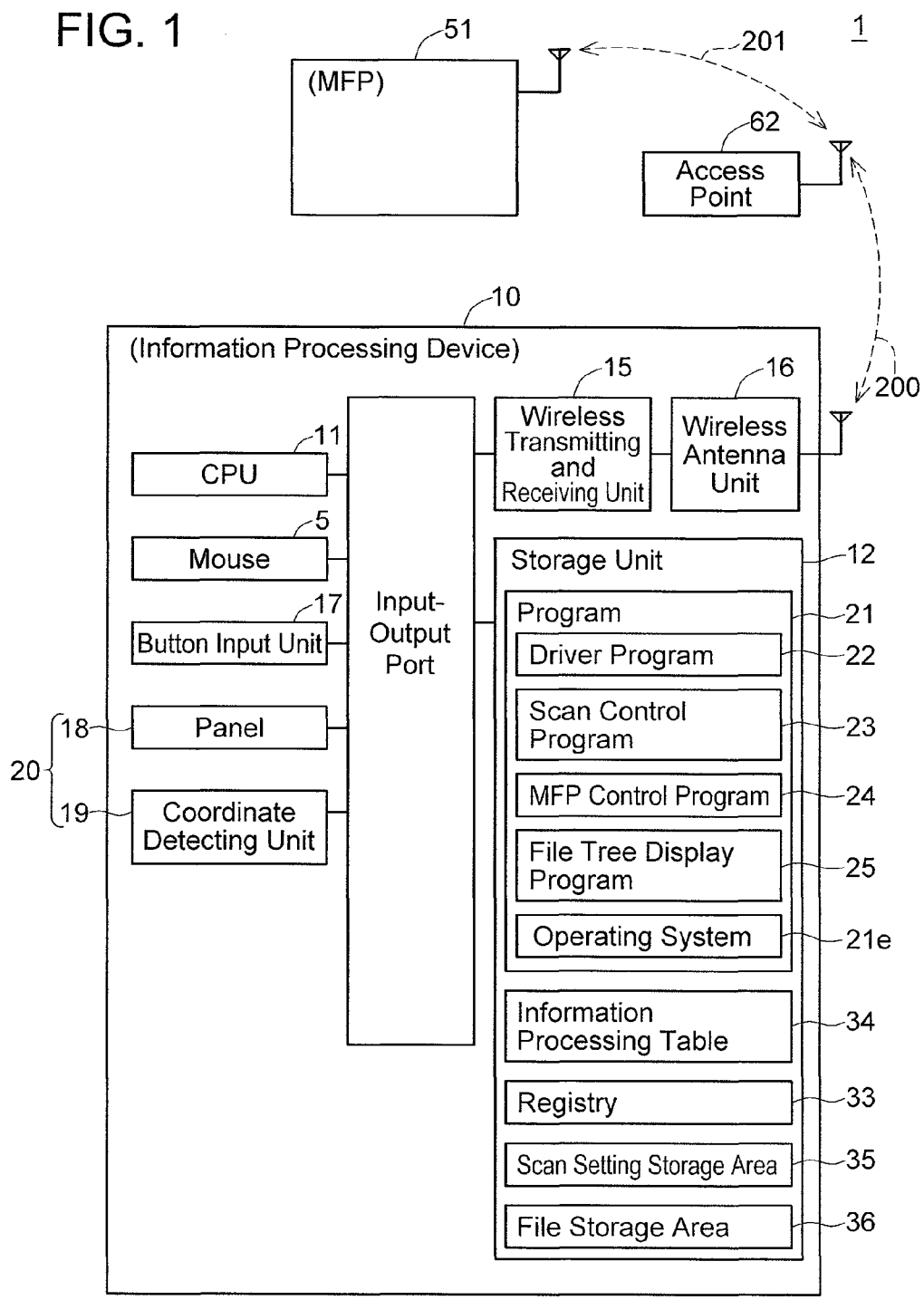
FIG. 1 is a block diagram of a communication system 1.

FIG. 1 illustrates a block diagram of a communication system 1 illustrated as an embodiment of the present application. The communication system 1 includes an information processing device 10, a multifunction peripheral (referred to as MFP) 51, and an access point 62. The information processing device 10 is a personal computer (referred to as PC) which uses a pointing device such as a mouse. The MFP 51 is a multifunction peripheral having a printer function, a scanner function, a copier function, and other functions. The printer function is a function for executing a process of printing a printing image on a recording sheet. The scanner function is a function for executing a scan process of reading a document to generate scan data. The copier function is a function for executing a process of printing scan data on a recording sheet. The access point 62 is an existing relay device.

The information processing device 10 and the access point 62 can perform a wireless communication 200 according to an infrastructure-mode wireless LAN connection scheme. Moreover, the MFP 51 and the access point 62 can perform a wireless communication 201 according to an infrastructure-mode wireless LAN connection scheme. Examples of the scheme of the wireless communications 200 and 201 include a communication scheme defined by the IEEE 802.11a/b/g standards.

<Configuration of Information Processing Device 10>

The information processing device 10 chiefly comprises a mouse 5, a CPU (referred to as Central Processing Unit) 11, a storage unit 12, a wireless transmitting and receiving unit 15, a wireless antenna unit 16, a button input unit 17, a panel 18, and a coordinate detecting unit 19.

The wireless transmitting and receiving unit 15 performs wireless communication which conforms to an infrastructure mode of the wireless LAN, via the wireless antenna unit 16. The button input unit 17 receives an operation by a user of the information processing device 10. An example of the button input unit 17 is a keyboard.

The mouse 5 is a device for inputting pointer position information, selection instruction information, menu display information, and the like. The pointer position information is information indicating a moving direction or a moving amount of a pointer displayed on the panel 18. The pointer position information can be input by moving the mouse 5. The selection instruction information is information for giving an instruction to select an image corresponding to a display position of a pointer image. The selection instruction information can be input by a left-click operation of clicking a left-click button of the mouse 5. The menu display information is information for giving an instruction to display a menu image corresponding to a display position of a pointer image. The menu display information can be input by a right-click operation of clicking a right-click button of the mouse 5.

The panel 18 displays a variety of function information of the information processing device 10. The coordinate detecting unit 19 is a unit for detecting designated coordinates, these being coordinates indicating a position where an indicator (e.g., a fingertip of the user) is in contact with or in proximity to a display area of the panel 18. By being formed integrally with the panel 18, the coordinate detecting unit 19 functions as a touchscreen 20. The touchscreen 20 is a device for receiving the input such as selection instruction information or menu display information. The selection instruction information is information for giving an instruction to select an image corresponding to an instruction coordinate. The selection instruction information can be input by a tap operation of bringing a pointing tool into contact with the touchscreen 20 for a short period. The menu display information is information for giving an instruction to display a menu image corresponding to an instruction coordinate. The menu display information can be input by a long-press operation of bringing a pointing tool into contact with the touchscreen 20 for a long period.

That is, the information processing device 10 is a device capable of receiving an input operation utilizing the two input systems: the input system utilizing the mouse 5 and the input system utilizing the touchscreen 20.

The CPU 11 executes processing according to the program 21 stored in the storage unit 12. In the ensuing explanation, the CPU 11 to execute programs such as the document creation application 31 and the operating system 21e is sometimes simply referred to by the program name. For example, the indication of "the operating system 21e" may mean "the CPU 11 that executes the the operating system 21e".

The storage unit 12 is configured such that a RAM (referred to as Random Access Memory), a ROM (referred to as Read Only Memory), a flash memory, an HDD (referred to as hard disk drive), and a buffer provided in the CPU 11, etc. are combined. The storage unit 12 stores a program 21. The program 21 includes an operating system 21 e, a driver program 22, a scan control program 23, a MFP control program 24, and a file tree display program 25. The respective programs, the driver program 22 to the file tree display program 25, can be used by being installed in the information processing device 10 by a user. Moreover, the storage unit 12 stores a registry 33, an information processing table 34, a scan setting storage area 35, and a file storage area 36.

The operating system 21e (hereinafter sometimes referred to as an OS 21e) is a program that provides a function of displaying various images on the panel 18 and basic functions which are used in common to the respective programs, the driver program 22 to the file tree display program 25. Further, the operating system 21e is also a program that provides an API (referred to as Application Programming Interface) for the applications to provide instructions to various types of hardware. In the present specification, a case will be described in which Windows 8® (registered trademark of Microsoft Corporation) is utilized as the operating system 21e.

The driver program 22 is a program for controlling the MFP 51. The scan control program 23 is a program for controlling a scan process of the MFP 51. Due to the scan control program 23, it is possible to exchange various types of data (for example, scan data generated by the scan process) related to the scan process with the MFP 51. The scan control program 23 is a program that can be activated via a menu screen displayed by a right-click operation, which will be described later. The MFP control program 24 is a program for changing various settings of the MFP 51 and allowing the MFP 51 to execute various functions. The file tree display program 25 is a program for displaying various data files stored in the file storage area 36 in a tree structure.

The registry 33 is a database that stores setting data of various programs such as the operating system 21e or the driver program 22 to the file tree display program 25. When the scan control program 23 is installed in the information processing device 10, the registry key of the scan control program 23 is added to the registry 33. Specifically, the path of the scan control program 23 is added to the command data of the registry 33. In this way, an activation reception image N1 for receiving the input of an instruction to activate the scan control program 23 can be added to a right-click menu image (see FIG. 7) displayed in S225 (described later).

The file storage area 36 is an area in which various data files are stored. The file storage area 36 has a layered file structure which is a structure that stores data files using a plurality of folders. Each of the plurality of folders can store a sub-folder which is a lower-layer folder and various data files.

The image data file stored in the file storage area 36 may have a first format or a second format. The first format is a format to which various types of metadata can be appended. Examples of the first format include JPEG, TIFF, PDF, and the like. The second format is a format to which various types of metadata cannot be appended. Examples of the second format include bitmap. An example of metadata includes processing information indicating the content of image processing (for example, color correction or trimming) performed on the image data file itself.

The information processing table 34 is an area in which processing information and the image data file having the second format are stored in correlation. The processing information of an image data file on which image processing has not been executed is not stored in the information processing table 34. The processing information is information indicating the content of image processing executed on an image data file having the second format. Examples of image processing include color correction, inclination correction, trimming, or the like.

The scan setting storage area 35 is an area in which a default scan setting value of the scan control program 23 and a default scan setting value of the MFP control program 24 are stored. The default scan setting value may be set in advance by a user. The default scan setting value may include resolution, the number of colors, an image format, an image size, and the like.

<Operation of OS 21e>

Figure 2:
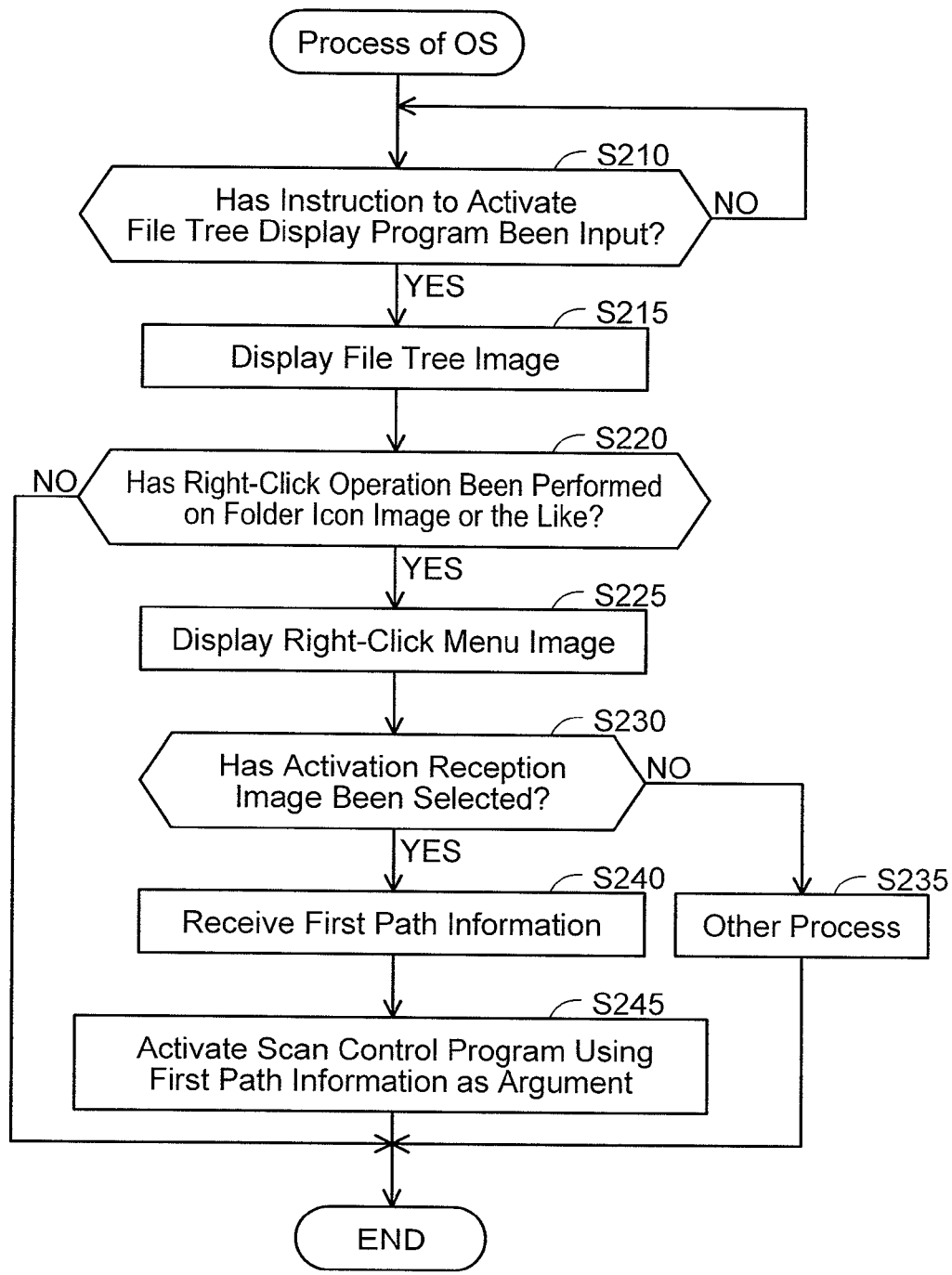
FIG. 2 is a diagram illustrating an operation flowchart of an OS.

The operation of the OS 21e according to the present embodiment will be described with reference to the flowchart of FIG. 2. When a user inputs an operation of activating the information processing device 10 via the button input unit 17, the CPU 11 reads the OS 21e to start controlling the entire information processing device 10. In this way, the flow of FIG. 2 starts.

In S210, the OS 21e determines whether an instruction to activate the file tree display program 25 has been input. This determination may be made, for example, by determining whether a double-click operation has been input for the icon image of the file tree display program 25. The flow returns to S210 when a negative determination result is obtained (S210: NO), and proceeds to S215 when a positive determination result is obtained (S210: YES).

Figure 6:
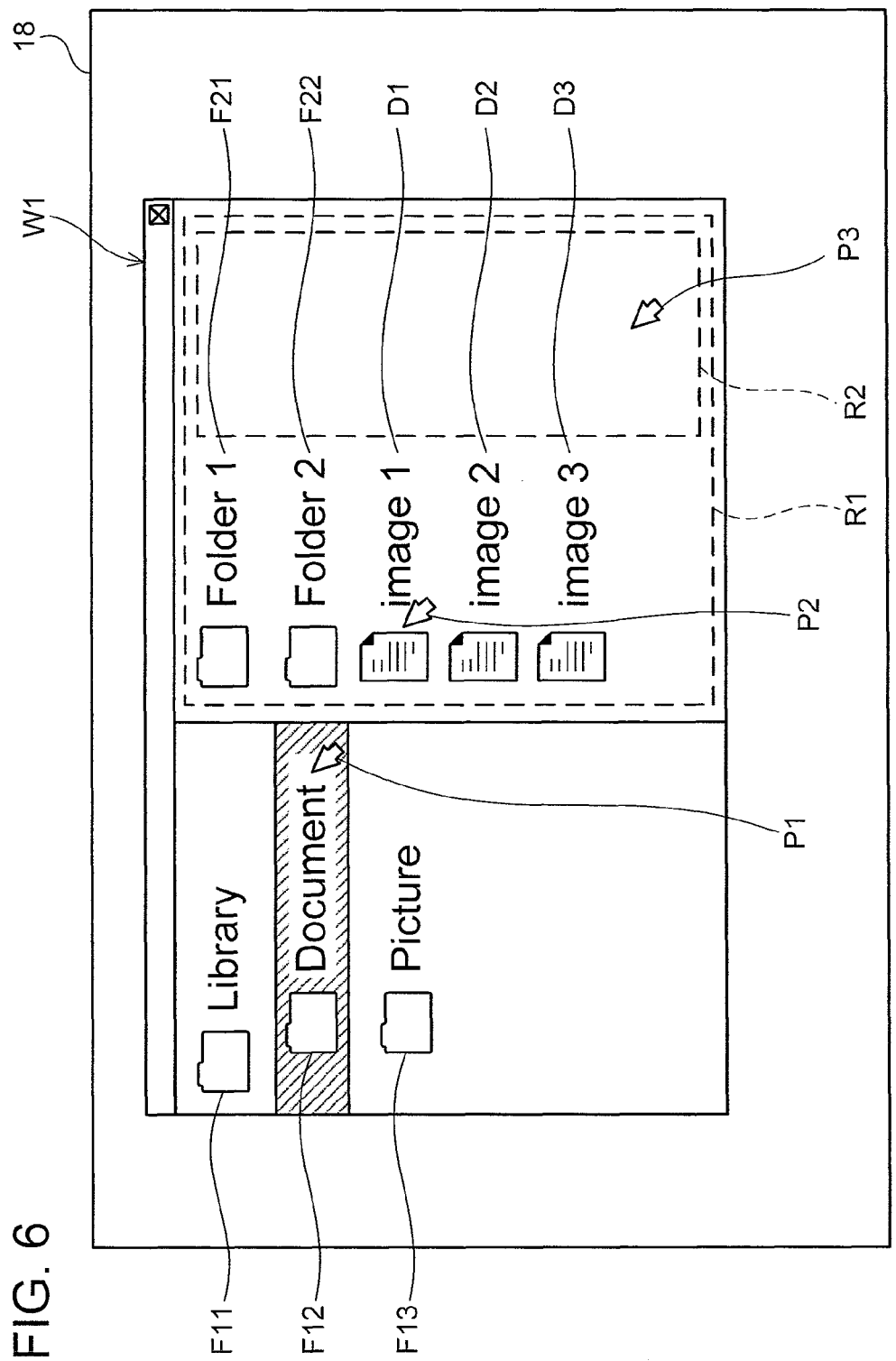
FIG. 6 is a diagram illustrating an example of a display screen.

In S215, the OS 21e activates the file tree display program 25. Moreover, the OS 21e displays a file tree image on the panel 18. FIG. 6 illustrates a file tree image W1 which is an example of the file tree image. The file tree image W1 includes folder icon images F11 to F13, F21, and F22 and data file icon images D1 to D3. As illustrated in the file tree image W1, the file storage area 36 stores various data files in a layered file structure using a plurality of folders. Specifically, folders indicated by the folder icon images F12 and F13 are stored in the folder indicated by the folder icon image F11. The folder indicated by the folder icon image F11 is a highest-layer folder of the layered file structure. In FIG. 6, a case in which the folder icon image F12 is selected is described. In this case, the content stored in the folder indicated by the folder icon image F12 is displayed in a display area R1. The display area R1 includes the folder icon images F21 and F22, the data file icon images D1 to D3, and a blank area image R2. The blank area image R2 is an area in which any one of the folder icon image and the data file icon image is not displayed. As described above, in the layered file structure of the file storage area 36, folders and data files may be stored together in a certain folder. In the description example of the present embodiment, the operation when the display screen illustrated in FIG. 6 is displayed will be described.

In S220, the OS 21e determines whether a right-click operation has been performed on any one of the folder icon image, the data file icon image, and the blank area image R2. For example, as illustrated in FIG. 6, in a state in which a pointer image P1 is present in the display area of the folder icon image F12, when the right-click button of the mouse 5 is clicked and the menu display information is input, the OS 21e determines that a right-click operation has been performed on the folder icon image F12. Moreover, for example, as illustrated in FIG. 6, in a state in which the pointer image P2 is present in the display area of the data file icon image D1, when the right-click button of the mouse 5 is clicked and the menu display information is input, the OS 21e determines that a right-click operation has been performed on the data file icon image D1. Further, for example, as illustrated in FIG. 6, in a state in which the pointer image P3 is present in the blank area image R2, when the right-click button of the mouse 5 is clicked and the menu display information is input, the OS 21e determines that a right-click operation has been performed on the blank area image R2. The blank area image R2 indicates the folder icon image F12. Thus, the right-click operation on the blank area image R2 is the same as the right-click operation on the folder icon image F12. In S220, the flow ends when a negative determination result is obtained (S220: NO), and proceeds to S225 when a positive determination result is obtained (S220: YES).

In S225, the OS 21e displays the right-click menu image on the panel 18 in a pull-down manner. The right-click menu image includes an activation reception image for receiving the input of an instruction to activate the scan control program 23. FIG. 7 illustrates a right-click menu image W2 which is an example of the right-click menu image. The right-click menu image W2 is an image displayed when the right-click button of the mouse 5 is clicked in the state of the pointer image P1 of FIG. 6. The right-click menu image W2 includes reception images for receiving the input of various instructions. The activation reception image N1 is one of the reception images.

In S230, the OS 21e determines whether the activation reception image has been selected. For example, as illustrated in FIG. 7, in a state in which the pointer image P11 is present in the display area of the activation reception image N1, when a left-click button of the mouse 5 is single-clicked and the selection instruction information is input, the OS 21e determines that the activation reception image N1 is selected. When a negative determination result is obtained in S230 (S230: NO), the flow proceeds to S235 and the other processes are executed. After that, the flow ends. On the other hand, when a positive determination result is obtained (S230: YES), the flow proceeds to S240.

In S240, the OS 21e receives first path information for accessing a folder or a data file indicated by the image on which the right-click operation has been input. The first path information may be an absolute path. For example, as illustrated in FIG. 6, in a state in which the pointer image P1 is present in the display area of the folder icon image F12, when the right-click operation is input, first path information for accessing a "document" folder indicated by the folder icon image F12 is received. Moreover, for example, as illustrated in FIG. 6, in a state in which the pointer image P2 is present in the display area of the data file icon image D1, when the right-click operation is input, first path information for accessing an "image 1" data file indicated by the data file icon image D1 is received. Further, for example, as illustrated in FIG. 6, in a state in which the pointer image P3 is present in the blank area image R2, when the right-click operation is input, first path information for accessing a "document" folder indicated by the folder icon image F12 is received.

In S245, the OS 21e activates the scan control program 23 using the first path information received in S240 as an argument. After that, the flow ends.

<Operation of Scan Control Program 23>

Figure 4:
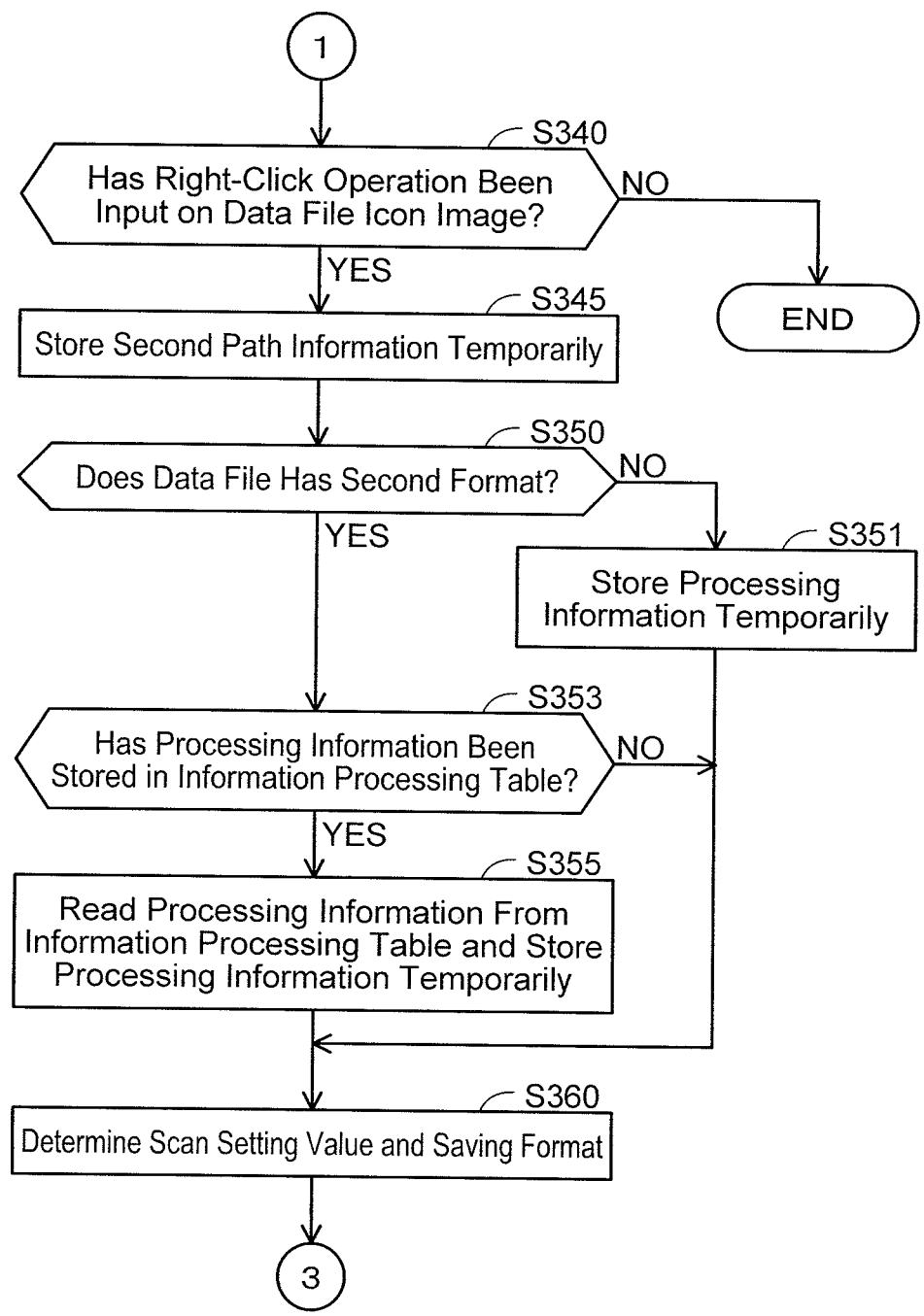
FIG. 4 is a diagram illustrating an operation flowchart of a scan control program.
Figure 5:
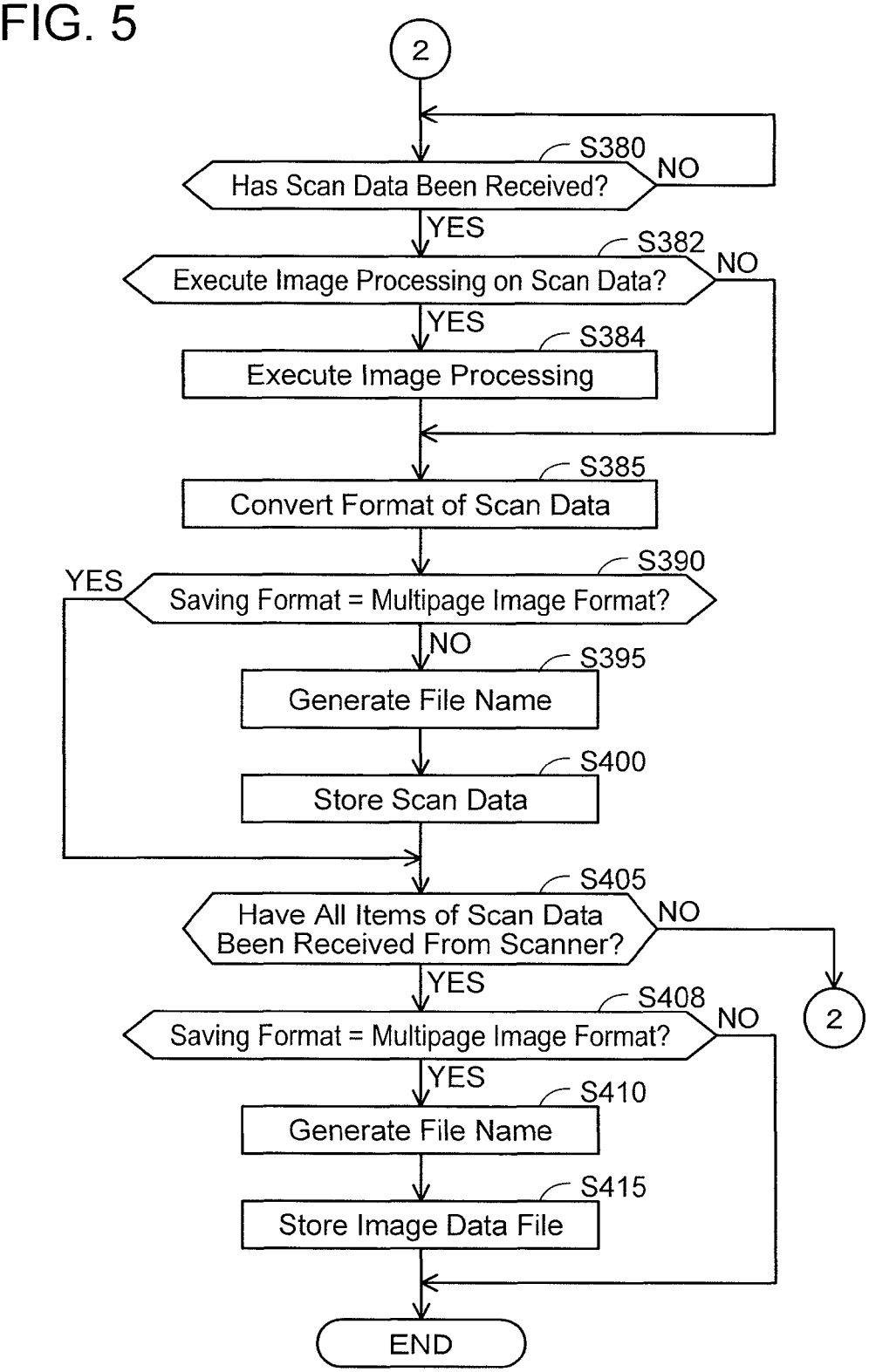
FIG. 5 is a diagram illustrating an operation flowchart of a scan control program.

The operation of the scan control program 23 according to the present embodiment will be described with reference to the flowcharts of FIGS. 3 to 5. In S245, the flow of FIG. 3 starts in response to activation of the scan control program 23. In S310, the scan control program 23 receives the first path information based on the argument generated in S240.

In S315, the scan control program 23 determines whether the image on which the right-click operation has been input in S220 is a folder icon image or a blank area image. This determination may be made by determining whether an access destination of the first path information received in S310 is a folder. When a positive determination result is obtained (S315: YES), the flow proceeds to S320. In S320, the scan control program 23 stores the first path information in the storage unit 12 temporarily.

In S325, the scan control program 23 determines whether the image data file is stored in the folder indicated by the first path information. When a positive determination result is obtained, the flow proceeds to S330.

In S330, the scan control program 23 determines a scan setting value and a saving format based on the attribute of the image data file that is stored in the folder indicated by the first path information. After that, the flow proceeds to S370. The attribute of the image data file includes resolution, the number of colors, an image format, an image size, and the like. The scan setting value is a value indicating the attribute of the scan data generated by the MFP 51. The saving format is an image format used when storing (S400) the image data file received from the MFP 51 in the file storage area 36.

A specific example of a method of determining the scan setting value will be described. The scan control program 23 receives the attribute of all image data files that are stored in the folder indicated by the first path information. The setting value used most frequently for each attribute is determined as the scan setting value. For example, when 300 dpi is used most frequently, the resolution of the scan setting value is determined to "300 dpi". Specifically, in a case where three image data files are stored in the folder, respective resolutions of the files are "300 dpi", "200 dpi", and "300 dpi". In this case, "300 dpi" is determined to be used most frequently. Moreover, when "color" is used most frequently, the number of colors of the scan setting value is determined to "color". Specifically, in a case where three image data files are stored in the folder, the respective numbers of colors of the three files are "black and white", "color", and "color". In this case, "color" is determined to be used most frequently. Thus, for example, the scan setting values can be determined to be "300 dpi", "color", "JPEG", and "A4 size", respectively for the attributes of "resolution", "number of colors", "image format", and "image size".

On the other hand, when a negative determination result is obtained in S325 (S325: NO), the flow proceeds to S335. In S335, the scan control program 23 reads the default scan setting value of the scan control program 23, stored in the scan setting storage area 35. Moreover, the scan control program 23 determines the scan setting value and the saving format based on the read default scan setting value. After that, the flow proceeds to S370.

On the other hand, when a negative determination result is obtained in S315 (S315: NO), the flow proceeds to S340 of FIG. 4. In S340, the scan control program 23 determines whether the image on which the right-click operation has been input in S220 is a data file icon image. This determination may be made by determining whether the access destination of the first path information received in S310 is a data file. The flow ends when a negative determination result is obtained (S340: NO), and proceeds to S345 when a positive determination result is obtained (S340: YES).

In S345, the scan control program 23 receives second path information for accessing the folder that stores the data file indicated by the first path information and stores the second path information in the storage unit 12 temporarily.

In S350, the scan control program 23 determines whether the format of the data file indicated by the data file icon image on which the right-click operation has been input is a second format. As described above, the second format is a format to which image processing metadata cannot be appended. When a negative determination result is obtained (S350: NO), the flow proceeds to S351.

In S351, the scan control program 23 reads image processing metadata from the header information of the data file indicated by the data file icon image on which the right-click operation has been input. When the processing information is included in the image processing metadata, the scan control program 23 stores the processing information in the storage unit 12 temporarily. After that, the flow proceeds to S360.

On the other hand, when a positive determination result is obtained in S350 (S350: YES), the flow proceeds to S353. In S353, the scan control program 23 determines whether the processing information corresponding to the data file indicated by the data file icon image on which the right-click operation has been input is stored in the information processing table 34. The flow proceeds to S360 when a negative determination result is obtained (S353: NO), and proceeds to S355 when a positive determination result is obtained (S353: YES).

In S355, the scan control program 23 reads the processing information corresponding to the data file indicated by the data file icon image on which the right-click operation has been input from the information processing table 34 and stores the processing information in the storage unit 12 temporarily. After that, the flow proceeds to S360.

In S360, the scan control program 23 determines the scan setting value and the saving format based on the attribute of the data file indicated by the second path information. After that, the flow proceeds to S370.

Figure 3:
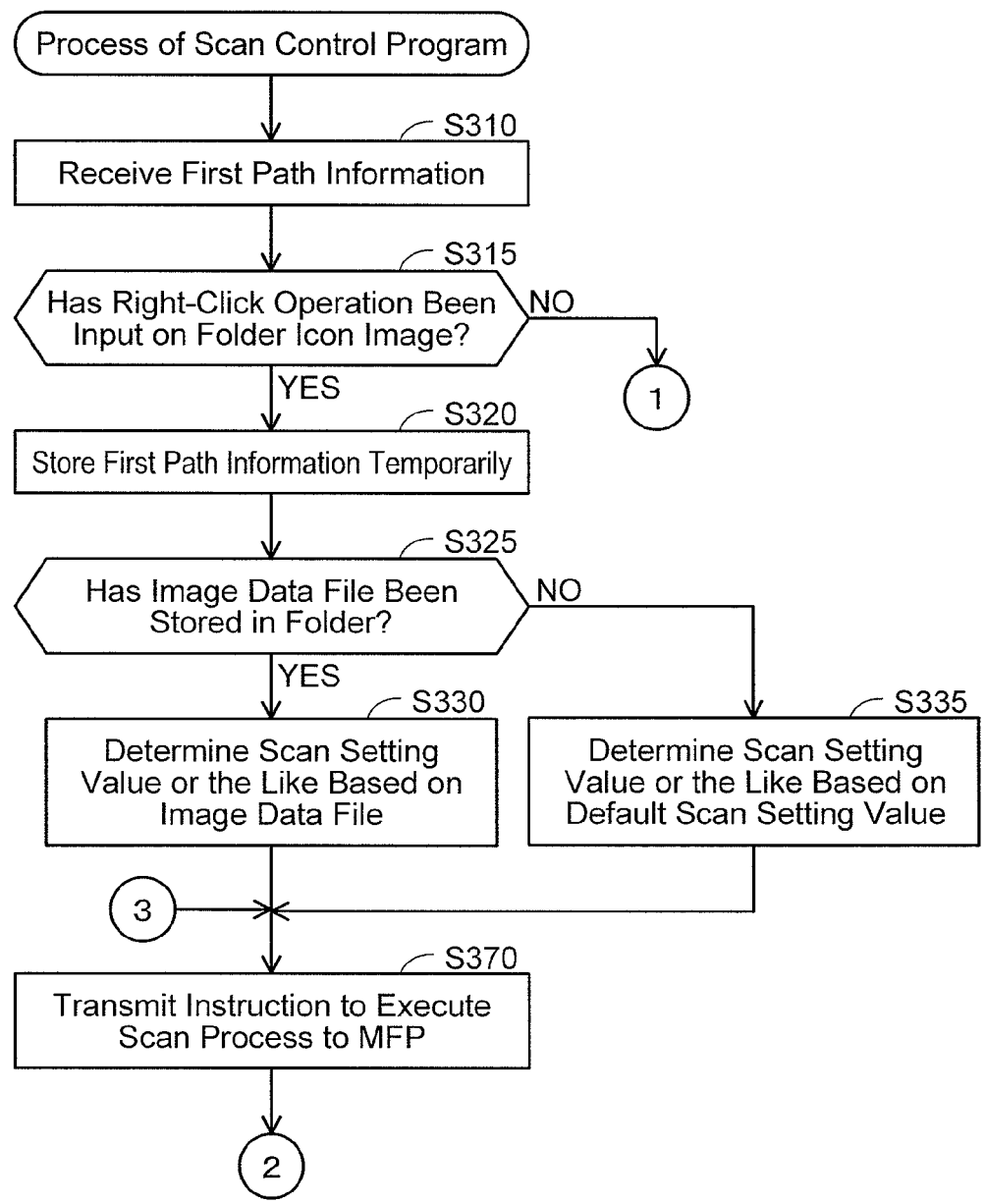
FIG. 3 is a diagram illustrating an operation flowchart of a scan control program.

In S370 of FIG. 3, the scan control program 23 transmits an instruction to executed the scan process to the MFP 51 via the wireless transmitting and receiving unit 15 and the wireless antenna unit 16. The instruction to execute the scan process is information that gives an instruction to generate scan data corresponding to the scan setting value determined in S330, S335, or S360. After that, the flow proceeds to S380.

When receiving the instruction to execute the scan process, the MFP 51 reads a document to generate scan data. In the description example of the present embodiment, the operation when N pages (N is a natural number of 1 or more) of document are scanned will be described. In this case, the MFP 51 transmits the generated scan data to the information processing device 10 whenever one page of scan data is generated. Thus, the process of transmitting scan data is performed N times.

In S380, the scan control program 23 determines whether one page of scan data has been received from the MFP 51. The flow returns to S380 when a negative determination result is obtained (S380: NO) and proceeds to S382 when a positive determination result is obtained (S380: YES).

In S382, the scan control program 23 determines whether image processing is to be executed on the scan data. This determination may be made by determining whether the processing information has been stored temporarily in the storage unit 12 by the process of S351 or S355. The flow proceeds to S385 when a negative determination result is obtained (S382: NO) and proceeds to S384 when a positive determination result is obtained (S382: YES). In S384, the scan control program 23 execute the image processing indicated by the processing information on the received scan data. After that, the flow proceeds to S385.

In S385, the scan control program 23 converts the format of the scan data to the saving format determined in S330, S335, or S360.

In S390, the scan control program 23 determines whether the saving format is a multipage image format. A multipage image format is a format capable of generating one data file that includes a plurality of pages of image data. Examples of the multipage image format include TIFF, PDF, and the like. Moreover, examples of non-multipage image format include bitmap, JPEG, and the like. The flow proceeds to S405 when a positive determination result is obtained in S390 (S390: YES), and proceeds to S395 when a negative determination result is obtained (S390: NO).

In S395, the scan control program 23 generates a file name. In S220, when the right-click operation is input on the data file icon image (S340: YES), a new file name that include a portion of the file name that is assigned to the data file indicated by the data file icon image is generated. For example, when the file name of a data file indicated by the data file icon image is "travel," a new file name "travel-1" may be generated. Moreover, in S220, when the right-click operation is input on the folder icon image or the blank area image (S315: YES), a new file name that includes a particular character string is generated. For example, when the particular character string is "new_scan_data," a new file name "new_scan_data-1" may be generated.

In S400, the scan control program 23 performs a process of storing one item of scan data received in S380 in association with the file name generated in S395. When the first path information is stored temporarily in the storage unit 12 (S320), it can be determined that the right-click operation has been input on the folder icon image or the blank area image. Thus, the scan control program 23 stores the received scan data in the folder indicated by the first path information. In this way, it is possible to store the received scan data in the folder indicated by the folder icon image on which the right-click operation has been input. On the other hand, when the second path information is stored temporarily in the storage unit 12 (S345), it can be determined that the right-click operation has been input on the data file icon image. Thus, the scan control program 23 stores the received scan data in the folder indicated by the second path information. In this way, it is possible to store the received scan data in the folder that stores the data file icon image on which the right-click operation has been input. After that, the flow proceeds to S405.

In S405, the scan control program 23 determines whether all N pages of scan data have been received from the scanner. When a negative determination result is obtained (S405: NO), the flow returns to S380 and the next one page of scan data is received. When a positive determination result is obtained (S405: YES), the flow proceeds to S408.

In S408, the scan control program 23 determines whether the saving format is a multipage image format. The flow ends when a negative determination result is obtained (S408: NO), and proceeds to S410 when a positive determination result is obtained (S408: YES).

In S410, the scan control program 23 generates a file name. The specific content of the process of S410 is the same as the content of the process of S395, and redundant description thereof will not be provided.

In S415, the scan control program 23 performs a process of storing one image data file having N pages of scan data in association with the file name generated in S410. The specific content of the process of S415 is the same as the content of the process of S400, and redundant description thereof will not be provided. After that, the flow ends.

<Advantages of First Embodiment>

There is a case in which the scan data generated by the MFP 51 is stored in a particular transfer destination folder in the file storage area 36. In this case, when a user wants to store the scan data in a folder selected by the user, it is necessary to move the scan data from the transfer destination folder to the folder selected by the user. According to the scan control program 23 and the like disclosed in the present specification, by inputting a right-click operation on the selected folder icon image (S220), it is possible to transmit an instruction to execute the scan process to the MFP 51 (S370). Moreover, it is possible to store the scan data received from the MFP 51 in the folder indicated by the selected folder icon image (S400 or S415). Further, by inputting a right-click operation on the selected data file icon image (S220), it is possible to transmit an instruction to execute the scan process to the MFP 51 (S370). Moreover, it is possible to store the scan data received from the MFP 51 in the folder in which the selected data file icon image is stored (S400 or S415). In this way, the user can store the scan data in the folder selected by the user by selecting the folder icon image or the data file icon image. Since it is not necessary to move the scan data from the transfer destination folder to the folder selected by the user, it is possible to improve operability. Moreover, since it is not necessary to perform both an operation of inputting an instruction to execute the scan process and an operation of designating the folder icon image indicating a folder in which the scan data is to be stored, it is possible to improve operability.

According to the scan control program 23 and the like disclosed in the present specification, it is possible to determine the scan setting value and the saving format automatically based on the attribute of the image data file corresponding to the data file icon image on which the right-click operation has been input (S360). Moreover, it is possible to determine the scan setting value and the saving format automatically based on the attribute of the image data file stored in the folder corresponding to the folder icon image on which the right-click operation has been input (S330). Further, when the image data file is not stored in the folder corresponding to the folder icon image on which the right-click operation has been input (S325: NO), it is possible to determine the scan setting value and the saving format automatically based on a particular default scan setting value (S335). Since it is not necessary to perform an operation of inputting the scan setting value and the saving format, it is possible to improve user's convenience.

According to the scan control program 23 and the like disclosed in the present specification, when a plurality of image data files are stored in the folder corresponding to the folder icon image on which the right-click operation has been input, it is possible to determine the setting value used most frequently as the scan setting value (S330). In this way, it is possible to determine an optimal scan setting value automatically.

According to the scan control program 23 and the like disclosed in the present specification, it is possible to designate a storage destination folder of the scan data with a simple operation (S220) of performing a right-click operation using the mouse 5. Thus, it is possible to improve the user's convenience.

According to the scan control program 23 and the like disclosed in the present specification, it is possible to read image processing metadata including processing information from the header information of the data file indicated by the data file icon image on which the right-click operation has been input (S351). Moreover, it is possible to execute the image processing indicated by the processing information on the received scan data automatically (S384). In this way, since it is not necessary to perform an operation of giving an instruction on the content of the image processing, it is possible to improve convenience.

According to the scan control program 23 and the like disclosed in the present specification, when the data file indicated by the data file icon image on which the right-click operation has been input has the second format to which image processing metadata cannot be appended (S350: YES), it is possible to read the processing information corresponding to the data file from the information processing table 34 (S355). Moreover, it is possible to execute the image processing indicated by the processing information on the received scan data automatically (S384). In this way, since it is not necessary to perform an operation of giving an instruction on the content of the image processing, it is possible to improve convenience.

According to the scan control program 23 and the like disclosed in the present specification, when the right-click operation has been input on the data file icon image (S340: YES), it is possible to generate a new file name that includes a portion of the file name that is assigned to the data file indicated by the data file icon image (S395). In this way, since it is possible to assign an appropriate file name to the received scan data automatically, it is possible to improve the user's convenience.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

<Modification>

Various other methods may be used for determining the scan setting value in S330. For example, the scan control program 23 may determine the scan setting value based on the attribute of an image data file stored the latest among all image data files that are stored in the folder indicated by the first path information. In this way, when a plurality of image data files are stored in the folder corresponding to the folder icon image on which the right-click operation has been input, it is possible to determine the setting value used in the newest image data file as the scan setting value. Thus, it is possible to determine an optimal scan setting value automatically.

In the present embodiment, although a case in which the menu display information is input by the right-click operation has been described, the present invention is not limited to this embodiment. Even when the menu display information is input by a long-press operation on the touchscreen 20, the technique described in the present specification can be realized.

The information processing device 10 is not limited to a PC. The information processing device 10 may be a tablet terminal or a smartphone that receives the input of an operation on a touchscreen.

The communication between the information processing device 10 and the MFP 51 is not limited to the wireless communications 200 and 201. For example, the communication may be realized by a USB connection. In this case, the information processing device 10 may include a USB interface. Moreover, the information processing device 10 may be connected to the MFP 51 by a USB interface and a USB cable.

In S220, the right-click operation on a plurality of folder icon images may be received. In this case, the scan data received from the MFP 51 may be stored in the plurality of folders indicated by the plurality of selected folder icon images (S400 or S415).

In S360, when the data file indicated by the second path information includes a plurality of pages of image data, the scan setting value may be determined for each page based on the attribute of the page. In S370, an execution instruction for generating scan data may be transmitted based on the scan setting value of each page. For example, when the first page of the data file indicated by the second path information is color and the second and subsequent pages are monochrome, an execution instruction may be transmitted so that the first page of scan data is color and the second and subsequent pages are monochrome.

When the right-click operation is input (S220: YES), the scan instruction may be executed using the default scan setting value of the scan control program 23 stored in the scan setting storage area 35. In this case, the flow may proceed from S310 to S335.

In S335, the default scan setting value (for example, the default scan setting value of the MFP control program 24) of another program other than the scan control program 23 may be used.

In S245, the OS 21e may activate the MFP control program 24.

The manner of display of the display screens shown FIGS. 6 and 7 are examples, and other display modes may also be utilized.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

Each program may be constituted by a single program module or by a plurality of program modules. Each example may adopt another replaceable configuration which is within the context of the present invention. Adoptable configurations include a hardware configuration (the panel 18 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

The invention claimed is:

1. A non-transitory computer-readable recording medium storing computer-readable instructions for an information processing device,
   the information processing device comprising:
      a processor;
      a display;
      an input unit configured to receive various operation inputs;
      a memory provided with a storage area for storing various types of data; and
      a communication interface configured to connect to a network,
   the information processing device being configured to communicate via the communication interface with an image processing device, the image processing device being configured to perform a scan process of scanning a document and generating scan data,
   wherein the computer-readable instructions, when executed by the processor, cause the information processing device to perform:
displaying a first image indicating the storage area on the display;
displaying a second image on the display, in response to receiving a first specific operation in the input unit, the first specific operation being performed on the first image;
receiving a second specific operation in the input unit, the second specific operation being for selecting the second image;
receiving first path information in response to receiving the second specific operation, the first path information indicating a location of the storage area;
retrieving a first setting value of an attribute from a particular attribute;
sending a first execution instruction of the scan process to the image processing device via the communication interface in the case that the second specific operation is received in the input unit, the first execution instruction including an instruction to generate the scan data according to the first setting value;
receiving scan data generated by the scan process from the image processing device; and
storing, using a format based on the first setting value, a data file of the received scan data in the storage area designated by the first path information.

2. The non-transitory computer-readable recording medium according to claim 1, wherein
the information processing device further includes a mouse, and
the first specific operation is a right-click on the mouse where a pointer image is located on the first image.

3. The non-transitory computer-readable recording medium according to claim 1, wherein
the information processing device further includes a touchscreen configured to detect a instruction coordinate indicating a position of a pointer's contact or approach in a display region of the display, the first image being displayed in the display region, and
the first specific operation is that the pointer contacts with or approaches the display where the first image is displayed over a particular time or larger.

4. The non-transitory computer-readable recording medium according to claim 1, wherein
the computer-readable instructions cause the information processing device to further perform:
displaying a third image on the display, the third image indicating data file stored in the storage area;
displaying a fourth image in response to receiving a third specific operation in the input unit, the third specific operation being performed on the third image;
receiving a fourth specific operation in the input unit, the fourth specific operation being for selecting the fourth image;
receiving second path information in response to receiving the fourth specific operation, the second path information indicating a location of the storage area where the data file indicated by the third image is stored;
sending a second execution instruction of the scan process to the image processing device via the communication interface, in the case that the fourth specific operation is received in the input unit; and
receiving scan data generated by the scan process from the image processing device; and
storing a data file of the received scan data in the storage area designated by the second path information.

5. The non-transitory computer-readable recording medium according to claim 4, wherein
the computer-readable instructions cause the information processing device to further perform retrieving a second setting value of an attribute of a particular data file corresponding to the third image,
the second execution instruction includes an instruction to generate the scan data according to the second setting value, and
the data file of the received scan data is stored using a format based on the second setting value.

6. The non-transitory computer-readable recording medium according to claim 5, wherein
the data file stored in the storage area includes data file of a first format or data file of a second format, the data file of the first format being adapted for adding specific metadata indicating a content of an image processing performed on the data file itself, and the data file of the second format not being adapted for adding the specific metadata, and
the computer-readable instructions cause the information processing device to further perform:
determining whether the data file corresponding to the third image is of the first format;
determining whether the specific metadata is added to the data file corresponding to the third image; and
in a case that the data file corresponding to the third image is of the first format and the specific metadata is added to the data file corresponding to the third image, performing the image processing indicated by the specific metadata on the received scan data.

7. The non-transitory computer-readable recording medium according to claim 6, wherein
the memory stores process information indicating a content of an image processing performed on the data file of the second format, and
the computer-readable instructions cause the information processing device to further perform:
determining whether the data file corresponding to the third image is of the second format;
determining whether the specific process information is stored in the memory; and
in a case that the data file corresponding to the third image is of the second format and the specific process information is stored in the memory, performing the image processing indicated by specific process information on the received scan data.

8. The non-transitory computer-readable recording medium according to claim 4, wherein
the data file corresponding to the third image includes a first file name, and
the computer-readable instructions cause the information processing device to further perform generating a second file name different from the first file name, the second file name including at least a part of the first file name, and
the data file of the received scan data is stored by being given the generated second file name.

9. The non-transitory computer-readable recording medium according to claim 4, wherein
the information processing device further includes a mouse, and
the third specific operation is a right-click on the mouse where a pointer image is located on the third image.

10. The non-transitory computer-readable recording medium according to claim 4, wherein
the information processing device further includes a touchscreen configured to detect a instruction coordinate indicating a position of a pointer's contact or approach in a display region of the display, and
the third specific operation is that the pointer contacts with or approaches the display where the third image is displayed over a particular time or larger.

11. A non-transitory computer-readable recording medium storing computer-readable instructions for an information processing device,
the information processing device comprising:
a processor;
a display;
an input unit configured to receive various operation inputs;
a memory provided with a storage area for storing various types of data; and
a communication interface configured to connect to a network,
the information processing device being configured to communicate via the communication interface with an image processing device, the image processing device being configured to perform a scan process of scanning a document and generating scan data,
wherein
the computer-readable instructions, when executed by the processor, cause the information processing device to perform:
displaying a first image indicating the storage area on the display;
displaying a second image on the display, in response to receiving a first specific operation in the input unit, the first specific operation being performed on the first image;
receiving a second specific operation in the input unit, the second specific operation being for selecting the second image;
receiving first path information in response to receiving the second specific operation, the first path information indicating a location of the storage area;
retrieving a first setting value of an attribute of a particular data file stored in the storage area in a case that a plurality of data files is stored in the storage area and each of the plurality of data files has a setting value of the attribute, the first setting value being a specific setting value that is most frequently included in the plurality of data files;
sending a first execution instruction of the scan process to the image processing device via the communication interface in the case that the second specific operation is received in the input unit, the first execution instruction including an instruction to generate the scan data according to the first setting value;
receiving scan data generated by the scan process from the image processing device; and
storing, using a format based on the first setting value, a data file of the received scan data in the storage area designated by the first path information.

12. The non-transitory computer-readable recording medium according to claim 11, wherein
in a case that a plurality of data files is stored in the storage area and each of the plurality of data files has a setting value of the attribute, the computer-readable instructions cause the information processing device to further perform determining the particular data file having the first setting value based on the attribute of the data file that has most recently been stored in the storage area.

13. The non-transitory computer-readable recording medium according to claim 11, wherein
the information processing device further includes a mouse, and
the first specific operation is a right-click on the mouse where a pointer image is located on the first image.

14. The non-transitory computer-readable recording medium according to claim 11, wherein
the information processing device further includes a touchscreen configured to detect a instruction coordinate indicating a position of a pointer's contact or approach in a display region of the display, the first image being displayed in the display region, and
the first specific operation is that the pointer contacts with or approaches the display where the first image is displayed over a particular time or larger.

15. The non-transitory computer-readable recording medium according to claim 11, wherein
the computer-readable instructions cause the information processing device to further perform:
displaying a third image on the display, the third image indicating data file stored in the storage area;
displaying a fourth image in response to receiving a third specific operation in the input unit, the third specific operation being performed on the third image;
receiving a fourth specific operation in the input unit, the fourth specific operation being for selecting the fourth image;
receiving second path information in response to receiving the fourth specific operation,
the second path information indicating a location of the storage area where the data file indicated by the third image is stored;
sending a second execution instruction of the scan process to the image processing device via the communication interface, in the case that the fourth specific operation is received in the input unit; and
receiving scan data generated by the scan process from the image processing device; and
storing a data file of the received scan data in the storage area designated by the second path information.

16. The non-transitory computer-readable recording medium according to claim 15, wherein
the computer-readable instructions cause the information processing device to further perform retrieving a second setting value of an attribute of a particular data file corresponding to the third image,
the second execution instruction includes an instruction to generate the scan data according to the second setting value, and
the data file of the received scan data is stored using a format based on the second setting value.

17. The non-transitory computer-readable recording medium according to claim 16, wherein
the data file stored in the storage area includes data file of a first format or data file of a second format, the data file of the first format being adapted for adding specific metadata indicating a content of an image processing performed on the data file itself, and the data file of the second format not being adapted for adding the specific metadata, and
the computer-readable instructions cause the information processing device to further perform:

determining whether the data file corresponding to the third image is of the first format;
determining whether the specific metadata is added to the data file corresponding to the third image; and
in a case that the data file corresponding to the third image is of the first format and the specific metadata is added to the data file corresponding to the third image, performing the image processing indicated by the specific metadata on the received scan data.

18. The non-transitory computer-readable recording medium according to claim 17, wherein
the memory stores process information indicating a content of an image processing performed on the data file of the second format, and
the computer-readable instructions cause the information processing device to further perform:
determining whether the data file corresponding to the third image is of the second format;
determining whether the specific process information is stored in the memory; and
in a case that the data file corresponding to the third image is of the second format and the specific process information is stored in the memory, performing the image processing indicated by specific process information on the received scan data.

19. The non-transitory computer-readable recording medium according to claim 15, wherein
the data file corresponding to the third image includes a first file name, and
the computer-readable instructions cause the information processing device to further perform generating a second file name different from the first file name, the second file name including at least a part of the first file name, and
the data file of the received scan data is stored by being given the generated second file name.

20. A non-transitory computer-readable recording medium storing computer-readable instructions for an information processing device,
the information processing device comprising:
a processor;
a display;
an input unit configured to receive various operation inputs;
a memory provided with a layered file structure using a folder, the folder storing various types of data; and
a communication interface configured to connect to a network,
the information processing device being configured to communicate via the communication interface with an image processing device, the image processing device being configured to perform a scan process of scanning a document and generating scan data,
wherein
the computer-readable instructions, when executed by the processor, cause the information processing device to perform:
displaying a first image indicating the folder on the display;
displaying a second image on the display, in response to receiving a first specific operation in the input unit, the first specific operation being performed on the first image;
receiving a second specific operation in the input unit, the second specific operation being for selecting the second image;
receiving first path information in response to receiving the second specific operation, the first path information indicating a location of the folder;
sending a first execution instruction of the scan process to the image processing device via the communication interface, in the case that the second specific operation is received in the input unit;
receiving scan data generated by the scan process from the image processing device; and
storing a data file of the received scan data in the folder designated by the first path information.

* * * * *